United States Patent Office 3,403,168
Patented Sept. 24, 1968

3,403,168
PREPARATION OF METALDEHYDE
Herbert Zima, Brig, Switzerland, assignor to Lonza Ltd., Gampel, Basel, Switzerland
No Drawing. Filed Aug. 23, 1965, Ser. No. 481,888
Claims priority, application Switzerland, Aug. 27, 1964, 11,250/64
8 Claims. (Cl. 260—340)

ABSTRACT OF THE DISCLOSURE

Metaldehyde is prepared by diluting acetaldehyde with an n-hydrocarbon having 4 to 8 carbon atoms and contacting it with aluminium or silicon (IV) bromide or with the bromide of acetic acid, trichloroacetic acid, or γ-bromoacetic acid.

---

This invention relates to the preparation of metaldehyde.

It is known to prepare metaldehyde by polymerization of acetaldehyde with the aid of small amounts of the halides of the alkaline earth metals, rare earths, lithium and titanium as well as in the presence of acids or acid salts at low temperatures. The yield hardly exceeds 8 percent, calculated on the acetaldehyde, because substantial amounts of paraldehyde are formed in the polymerization reaction.

I have now found that the yield of metaldehyde can be increased up to 11.8% when the acetaldehyde is diluted with a n-hydrocarbon, and when a metal bromide and/or carboxylic acid bromide ionizable in the reaction medium are used as catalyst.

As the presence of acids in the acetaldehyde favors the formation of paraldehyde, it is essential to use starting materials which are substantially free of acids.

Also the presence of mercury or iron interfere with the reaction. Said metals or their ions act as co-catalysts for the formation of paraldehyde and accelerate the rate of formation already in amounts of 1 p.p.m. of mercury or 5 p.p.m. of iron. In order to obtain high yields of metaldehyde and a homogeneous course of reaction, it is necessary to ensure the absence of mercury and iron.

It is of advantage to add to the acetyldehyde pyridine as co-catalyst in amounts of about 5 to 200, preferably about 100 p.p.m., by weight, calculated on the acetaldehyde.

Suitable diluting agents are n-hydrocarbons having 4 to 8 carbon atoms; I prefer to use n-pentane. The mixture of acetaldehyde and n-hydrocarbon should contain the n-hydrocarbon in amounts of 15 to 60, preferably 20 to 25 percent by weight.

Bromides which are ionizable in the reaction medium are essentially aluminium bromide, silicon (IV) bromide, and carboxylic acid bromides such as acetyl bromide, trichloroacetylbromide, γ-bromoacetic acid bromide, and others. Said bromides may be used alone or in mixture with each other. I found the best catalyst mixture to be a solution, preferably a saturated solution, of anhydrous aluminium bromide in acetyl bromide.

Anhydrous aluminium bromide is preferably used dissolved in an inert solvent e.g. n-hydrocarbon.

The catalysts are used in amounts of 0.05 to 2 percent by weight, calculated on acetaldehyde. However, these proportions are not critical and greater or less amounts can be used.

The reaction is carried out in the temperature range of −40 to +15° C.

The process of the invention can be carried out continuously with recovery of the acetaldehyde polymerized to paraldehyde. Thereby, the paraldehyde formed always as the principal reaction product is, after separation of the metaldehyde, depolymerized to monomeric acetaldehyde by heating.

For this purpose, it is, in contrast to the conventional depolymerization, not necessary to add dilute sulfuric acid. The catalyst which, after recovery of the metaldehyde, remains in the residue, produces on heating depolymerization of the paraldehyde. Therefore, it is sufficient to distill the mixture separated from the metaldehyde, which mixture consists essentially of paraldehyde and n-hydrocarbon. The obtained distillate consists of acetaldehyde and n-hydrocarbon and can be recycled into the polymerization reaction for the production of metaldehyde.

While all the known catalyst, and also acetyl bromide and silicon bromide, cause metaldehyde to be formed in needle-like crystals, aluminum bromide has the property to produce short prismatic well formed crystals of metaldehyde. Also a solution of aluminum bromide in acetyl bromide, which is saturated at room temperature, causes the metaldehyde to be formed in short prismatic shapes. Said crystal form, however, is obtained only when the acetaldehyde is diluted with a n-hydrocarbon such as n-pentane.

The following examples are given to illustrate but not to limit the invention.

EXAMPLE 1

A 2.5 liter 4-neck flask with ground-in stoppers is equipped with a propeller stirrer and with a glass coil for internal cooling, arranged around the shaft of the stirrer, a thermometer, a dropping funnel, and a $CaCl_2$ tube. The cooling is carried out by immersing the flask in a bath liquid of about −17° C. and pumping a brine of about −18° C. through said cooling coil.

The flask is charged with 1350 g. of mercury free acetaldehyde, 450 g. of n-pentane, and 0.14 g. of pyridine. Said mixture is cooled to about −13° C. Then the reaction is started by adding 13 ml. of acetyl bromide dropwise. Smaller batches require relatively more, larger batches relatively less catalyst, calculated on acetaldehyde. After an incubation time of about 50 minutes, the reaction starts and the mixture heats up to about −5° C. The optimum yield of 11.2 percent of metaldehyde is reached after 4½ hours. The metaldehyde is separated by filtration, washed with acetaldehyde, and dried at 35° C. The remaining mixture of paraldehyde and n-pentane is distilled whereby a mixture of acetaldehyde and n-pentane distills off continuously. The distillate is free of water and, after replacing the consumed acetaldehyde, is used for the next batch. The residue consists essentially of resin and catalyst and is discarded.

EXAMPLE 2

The procedure was as described in Example 1 but instead of acetyl bromide, a saturated solution of aluminum bromide in n-hexane was employed as catalyst. On addition of 7 ml. of the catalyst, the reaction started after about 5 minutes. After further 20 minutes, there were added 3 more ml. of catalyst. The reaction was terminated after 4 hours. The recovered metaldehyde was washed first with acetaldehyde and then with water, and dried in vacuo at 35° C. Yield: 9.5%.

EXAMPLE 3

The procedure was again as in the preceding examples but, instead of acetyl bromide, a saturated solution of aluminum bromide in acetyl bromide was employed. On addition of 2 ml. of the catalyst, the reaction started after about 15 minutes. After further 15 minutes, there was added 1 more ml. of the catalyst. The reaction was terminated after 4 hours. Washing and drying was carried out as in Example 2; yield 11.8%.

I claim:

1. A process for the preparation of metaldehyde comprising diluting substantially acid-free acetaldehyde with an n-hydrocarbon containing 4 to 8 carbon atoms and contacting said solution in a reaction zone with a catalyst which is ionizable in the reaction medium and selected from the group consisting of aluminium bromide, silicon (IV) bromide, acetyl bromide, trichloroacetyl bromide and γ-bromoacetyl bromide, in the temperature range of −40 to +15° C., thereby obtaining metaldehyde and as by-product paraldehyde, and separating said metaldehyde from said paraldehyde.

2. The process as claimed in claim 1 wherein said reaction medium is a mixture of said acetaldehyde and n-hydrocarbon containing 15 to 60 percent by weight of the hydrocarbon.

3. The process as claimed in claim 2 wherein said reaction medium is a mixture of said acetaldehyde and n-hydrocarbon containing 20 to 25 percent by weight of the hydrocarbon.

4. The process as claimed in claim 1 comprising adding to the reaction medium 5 to 200 p.p.m. pyridine, calculated on acetaldehyde.

5. The process as claimed in claim 4 comprising adding to the reaction medium 100 p.p.m. pyridine, calculated on acetaldehyde.

6. The process as claimed in claim 1 wherein the catalyst is anhydrous aluminum bromide.

7. The process as claimed in claim 1 wherein said acetaldehyde contains less than 1 p.p.m. of mercury and less than 5 p.p.m. of iron.

8. The process as claimed in claim 1 comprising the steps of heating the paraldehyde separated from the metaldehyde, thereby depolymerizing the same by the action of the catalyst contained therein, distilling off the formed acetaldehyde together with the n-hydrocarbon, and returning said distillate to said reaction zone.

References Cited

UNITED STATES PATENTS

| 1,467,733 | 9/1923 | Luscher | 260—340 |
| 1,555,223 | 9/1925 | Luscher | 260—340 |
| 2,426,961 | 9/1947 | Wilder | 260—340 |

NORMA S. MILESTONE, *Primary Examiner.*